United States Patent [19]
Perry

[11] 3,761,600
[45] Sept. 25, 1973

[54] ABOVE GROUND GAS-INSULATED PIPE TYPE TRANSMISSION CONFIGURATION

[75] Inventor: Elijah Robert Perry, Scottdale, Pa.

[73] Assignee: I-T-E Imperial Corporation, Spring House, Pa.

[22] Filed: Jan. 11, 1973

[21] Appl. No.: 322,718

[52] U.S. Cl. ............... 174/16 B, 138/108, 174/27, 174/40 R, 174/99 B
[51] Int. Cl. ............................................ H01b 9/06
[58] Field of Search ............... 174/27, 28, 29, 16 B, 174/99 B, 99 R, 37, 40 R, 45 R; 138/106, 108

[56] References Cited
UNITED STATES PATENTS

| | | | |
|---|---|---|---|
| 3,654,378 | 4/1972 | Rehder | 174/16 B |
| 3,639,673 | 2/1972 | Fujisaki et al. | 174/16 B |
| 3,582,533 | 6/1971 | Albright | 174/37 |
| 3,391,243 | 7/1968 | Whitehead | 174/28 |
| 3,361,870 | 1/1968 | Whitehead | 174/27 X |
| 3,164,667 | 1/1965 | Frowein | 174/27 |
| 2,306,527 | 12/1942 | Daniels | 174/16 B |
| 2,173,717 | 9/1939 | Hobart | 174/27 UX |
| 1,037,522 | 9/1912 | Pindtershofen | 174/27 |
| 3,349,168 | 10/1967 | Rehder et al. | 174/99 B |

Primary Examiner—Bernard A. Gilheany
Assistant Examiner—A. T. Grimley
Attorney—Sidney G. Faber et al.

[57] ABSTRACT

An arrangement for both supporting and protecting pipe enclosed bus runs of the multi-phase type. A single vertical support with appropriate support arms maintains the conduits in a delta arrangement. Protective baffle plates envelop the delta-configured bus housings to shield them from sunlight and hence maintain them at cooler temperatures, to protect the bus runs against damage and to promote convection cooling.

2 Claims, 1 Drawing Figure

PATENTED SEP 25 1973　　　　　　　　　　　　　　3,761,600
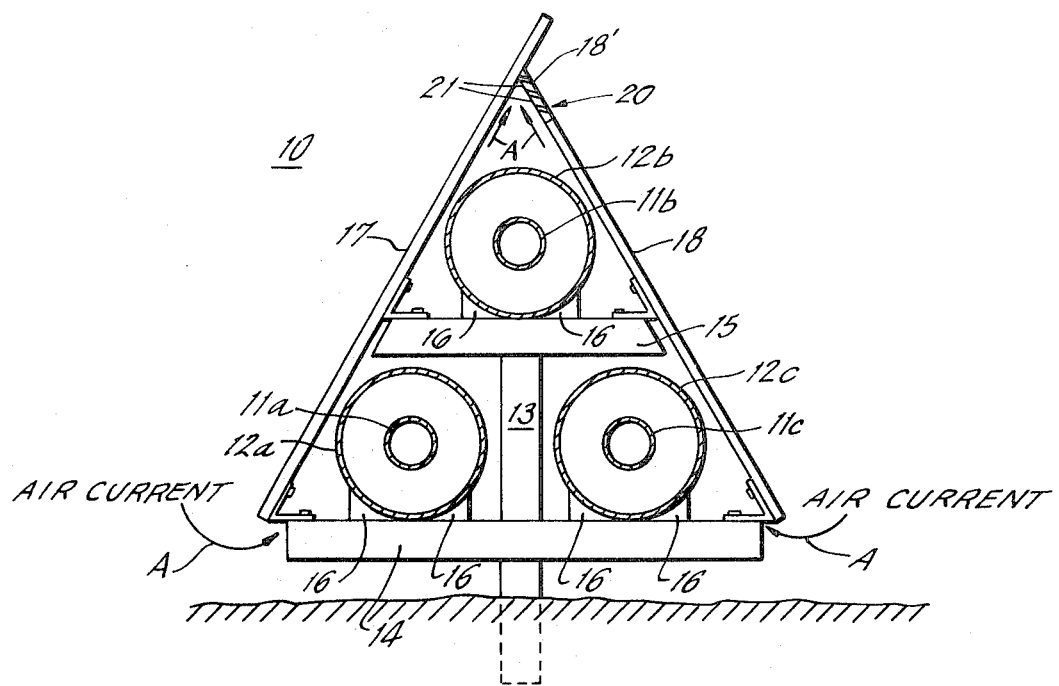

ABOVE GROUND GAS-INSULATED PIPE TYPE TRANSMISSION CONFIGURATION

The present invention relates to high-voltage bus runs and more particularly to high-voltage bus runs of the multi-phase type and a mounting and protective structure therefor to protect the bus run against damage to promote efficiency of the bus run and to simplify the bus run supporting assembly design and installation.

BACKGROUND OF THE INVENTION

The conventional approach to mounting transmission systems for above ground bus runs is to build supporting racks of metal upon which the bus enclosures are mounted in side-by-side arrangement so as to have thier central axes lying within an imaginary substantially horizontal plane. This technique requires rather large spacing between the phases, requiring rather expensive right-of-way acquisition, and further leads to housings exposed to sun radiation, which increases the temperature of the housing, thereby decreasing its load carrying capability. Exposed conduit of this type is also an enticing target for vandals and hunters resulting in costly repairs, as well as being susceptible to damage due to accidental causes.

BRIEF DESCRIPTION OF THE INVENTION AND OBJECTS

Support poles are arranged along the bus runs, with each being provided with cross arms secured thereto for supporting the three phases of the bus run in a delta configuration. Protective plates and baffles are secured in diagonal fashion along the sides of the bus runs to shield the bus run against direct sunlight and to protect it against accidental damage or damage due to vandalism. The side plates, in shielding the bus from sunlight, thereby reduce the operating temperature of the bus run, increasing its current carrying capability. The side plates further facilitate constant air flow around and about the bus housings to facilitate convection cooling thereof and to prevent condensation from forming on the housing surfaces.

It is therefore one object of the present invention to provide a novel support and protection assembly for bus runs of a multi-phase type, to protect the bus run against damage to enhance operating efficiency and to further reduce the size of right-of-way required for the bus run.

BRIEF DESCRIPTION OF THE DRAWING

The sole FIGURE is an elevational view of a bus run embodying the principles of the present invention.

DETAILED DESCRIPTION OF THE FIGURE

The sole FIGURE shows a bus run and support assembly 10 comprised of an isolated phase bus arrangement of the three-phase type, in which each of the phases is comprised of a central current carrying conductor 11a, 11b, and 11c, surrounded by a concentrically aligned conductive grounded housing 12a, 12b, and 12c respectively. Although not shown for purposes of simplicity, the central conductors 11a–11c are maintained in the concentric arrangement with their grounded conductive housing by means of disc-shaped insulating spacers arranged at spaced intervals along each bus run. A suitable spacing configuration, for example, is shown in detail in U. S. Pat. No. 3,573,341, issued Apr. 6, 1971, and assigned to the assignee of the present invention.

The three phases are maintained in a delta configuration by means of a support assembly, comprised of a single vertically aligned post member 13, driven into the ground G to a depth suitable for providing adequate supporting strength for the assembly. Secured to post 13 are a pair of cross arms 14 and 15, mounted to post 13 by any suitable fastening scheme. The cross arms 14 and 15 are preferably provided with wedge-shaped supports 16, secured to the cross arms by suitable fastening means so as to position and support each of the grounded conductive housings in the manner shown.

Support structures such as the post 13 and cross arms 14 and 15, with their wedge-shaped supporting member 16, are mounted at spaced intervals along the elongated bus run, with the spacing between supports being judiciously selected to provide adequate support for the phases of the bus run to prevent the portions of the bus structures extending between support structures from sagging or otherwise deflecting from a substantially straight line orientation.

Protective plates 17 and 18 are secured by means of angle brackets 19 to the cross arms 14 and 15, so as to form a substantially triangular shaped sidewall structure which may be painted or camouflaged or colored for aesthetic purposes. Plates 17 and 18 form a continuous substantially unbroken sidewall structure over the entire length of the bus run. Obviously, for practical reasons, the side plates may be of finite length, with a plurality of such plates being arranged in end-to-end fashion to cumulatively form a continuous sidewall structure. The plates 17 and 18 are positioned at a spaced distance from the conductive grounded housings 12a–12c, so as to permit the free flow of air around and between each of the housings. The plates 17 and 18 protect each of the phases from heat radiation from the sun, which is sufficient to lower the operating temperature of the bus and thereby provide an accompanying increase in their current carrying capabilities.

Due to the high voltage and current ratings of the bus, the heat generated by the bus is significantly higher than the ambient condition of the air surrounding the bus. This causes the ambient air to be heated. The heated air rises, and passes outwardly through the gap 20 provided at the upper end of plates 17 and 18. If desired the gap 20 may be filled with an extension of plate 18, identified as plate section 18′, which may be louvered as shown at 21 to permit the free flow of air therethrough, while substantially preventing the ingress of water or moisture therethrough.

The flow of heated air outwardly through gap 20 causes an inrush of cooler air through the open bottom end of the structure, resulting in convectioncooling of the bus run. Arrows A show the flow of air currents through the bus run and supporting structure. The constant flow of air through the structure further helps to prevent condensation from forming on the conductive housings, thereby significantly retarding the corrosion of the housings.

The protective plates may be formed of any suitable material commensurate with the type of protection desired. For example, if it is desired to protect against the rifle fire of hunters and the like, the plates may be formed of metal of a suitable thickness, whereas if the danger of vandalism is small, the plates may be of substantially thinner gauge metal or may be formed of a suitable non-metallic material of desired thickness. The supporting structure significantly reduces the cost of materials and assembly, since only one post per support structure need be anchored into the ground. The structure shown in the sole FIGURE may also be employed in the bed of an ocean if desired, with substantially the same advantages accruing from such an arrangement.

Although there has been described a preferred embodiment of this novel invention, many variations and modifications will now become apparent to those skilled in the art. Therefore, this invention is to be limited not by the specific disclosure herein, but only by the appending claims.

The embodiments of the invention is which an exclusive privilege or property is claimed are defined as follows.

1. A support structure for multi-phase elongated bus runs, each phase comprised of a central conductor and a concentric surrounding conductive housing with means for maintaining said conductor and said housing in their spaced concentric arrangement;

said support structure comprising a plurality of individual support assemblies arranged at spaced intervals along said bus run, each assembly comprising:
a vertically aligned post driven into the ground;
a plurality of cross-arms secured at spaced intervals along said post, each having means for positioning and supporting at least one of said phases;
a plurality of sideplates secured to the opposite free ends of the crossarms of said spaced support assemblies and being oriented in diagonal fashion to form a substantially triangular shaped enclosure for said bus run;
the upper ends of the sideplates converging towards one another from opposite sides of said support assemblies having a gap therebetween to permit the free flow of air exiting from the region between said sideplates to provide for convection cooling of said bus run.

2. The arrangement of claim 1 wherein said bus run comprises three phases;
two of said phases being supported upon one of said cross arms and the remaining phase being supported on another one of said cross arms, whereby said phases are arranged in a "delta" configuration.

* * * * *